United States Patent [19]

Addeo et al.

[11] Patent Number: 5,335,011
[45] Date of Patent: Aug. 2, 1994

[54] SOUND LOCALIZATION SYSTEM FOR TELECONFERENCING USING SELF-STEERING MICROPHONE ARRAYS

[75] Inventors: Eric J. Addeo, Long Valley; John D. Robbins, Denville; Gennady Shtirmer, Morris Plains, all of N.J.

[73] Assignee: Bell Communications Research, Inc., Livingston, N.J.

[21] Appl. No.: 3,380

[22] Filed: Jan. 12, 1993

[51] Int. Cl.⁵ .................. H04M 11/00; H04N 7/12
[52] U.S. Cl. ...................... 348/15; 379/206; 381/2
[58] Field of Search .............. 379/53, 54, 202, 206, 379/204, 100; 358/85; 381/24, 2; 348/14-16

[56] References Cited

U.S. PATENT DOCUMENTS

| | | | |
|---|---|---|---|
| 4,494,144 | 1/1985 | Brown | 379/100 |
| 4,581,758 | 4/1986 | Coker et al. | 379/206 |
| 4,658,425 | 4/1987 | Julstrom | 379/206 |
| 4,734,934 | 3/1988 | Boggs et al. | 379/206 |
| 4,815,132 | 3/1989 | Minami | 381/1 |
| 4,961,211 | 10/1990 | Tsugane et al. | 379/54 |
| 5,020,098 | 5/1991 | Celli | 379/206 |

FOREIGN PATENT DOCUMENTS 3252258  11/1991  Japan .................. 379/53

OTHER PUBLICATIONS

S. Julstrom et al, "Direction-Sensitive Gating—A New Approach to Automatic Mixing".

S. Shimada, et al., "A New Talker Location Recognition Through Sound Image Localization Control in Multipoint Teleconferencing Systems," Elec. and Comm. in Japan, part 1, vol. 72, No. 2, pp. 20–28, 1989.

Y. Shimizu, "Research on the Use of Stereophonics in Teleconferences" Business Japan, pp. 37–41, Mar. 1991.

F. Harvey, et al., "Some Aspects of Stereophony Applicable to Conference Use," J. of Audio Eng. Soc., vol. 11, pp. 1–6, Jul. 1963.

K. Farrell, et al., "Beamforming Microphone Arrays for Speech Enhancement," Proc. of ICASSP, pp. 285–288, 1992.

W. Kellermann, "A Self Steering Digital Microphone Array," Proc. of ICASSP, pp.3581–3584, 1991.

G. Kendall, et al. "Simulating the Cues of Spatial Hearing in Natural Environments," ICMC Proceedings, pp. 111–125, 1984.

L. Ludwig, et al., "Extending the Notion of a Window System, to Audio," Computer, pp. 66–72, Aug. 1990.

B. Gehring, "Focal Point 3D Audio User's Guide," Rev. 1, pp. 1–5, Nov. 1991.

*Primary Examiner*—Wing F. Chan
*Attorney, Agent, or Firm*—Leonard Charles Suchyta; Loria B. Yeadon

[57] ABSTRACT

A teleconferencing system 100 is disclosed having a video camera for generating a video signal representative of a video image of a first station B. A microphone array 150, 160 is also provided in the first station for receiving a sound from one or more fixed non-overlapping volume zones 151, 152, 153, 154, 155, 156, 157, 158, 159, into which the first station is divided. The microphone array is also provided for generating a monochannel audio signal 170 representative of the received sound and a direction signal indicating, based on the sound received from each zone, from which of the volume zones the sound originated. The teleconferencing system also includes a display device 120A at a second station A for displaying a video image of the first station. A loudspeaker control device 140 is also provided at the second station for selecting a virtual location 121 on the displayed video image depending on the direction signal, and for generating stereo sound from the monochannel audio signal which stereo sound emanates from the virtual location on the displayed video image.

19 Claims, 2 Drawing Sheets

SOUND LOCALIZATION SYSTEM FOR TELECONFERENCING USING SELF-STEERING MICROPHONE ARRAYS

RELATED APPLICATIONS

The subject matter of the present application is related to the subject matter of the following applications:

1. "Video Teleconferencing System", U.S. Pat. application Ser. No. 07/774,182, filed Oct. 9, 1991 for Eric Addeo, Thomas H. Judd, Henri E. Tohme and Michael H. Bianchi, now U.S. Pat. No. 5,280,540, issued on Jun. 18, 1994 and 2. "Audio Processing System For Teleconferencing System", U.S. Pat. application Ser. No. 07/774,085, filed Oct. 9, 1991 for Eric John Addeo and Gennady Shtirmer now U.S. Pat. No. 5,271,057 issued on Dec. 14, 1993.

The above applications are assigned to a common assignee hereof and are incorporated herein by reference.

FIELD OF THE INVENTION

The present invention relates to a teleconferencing system. Specifically, the present invention relates to an audio system for use in a teleconferencing system.

BACKGROUND OF THE INVENTION

The goal of a teleconferencing system is to bring the participants at the ends of the communication as "close as possible". Ideally, the effect obtained in a good communication should be one of "being there".

A teleconferencing system comprises two or more remotely located stations which are interconnected by a transmission system. Two teleconference participants located at the two remote stations are in audio and video communication with each other. To accomplish the audio and video communication, each station typically includes one or more microphones for generating an audio signal for transmission to the other station, a speaker for receiving an audio signal from the other station, a video camera for generating a video signal for transmission to the other station and a display device for displaying a video signal generated at the other station. Each station also typically includes a codec for coding the video signal generated at the station for transmission in a compressed form to the other station and for decoding a coded video signal received from the other station.

One of the difficulties encountered in achieving a high degree of presence is the limited eye contact due to some inherent practical constraints of the system. For example, the camera must be placed so that it does not obstruct the view of the display device (e.g., at an angle to the faces of the participants). In addition, the introduction of video compression noise tends to degrade the image of the speaker's eyes and lips. A high quality wide band fully interactive audio system may be provided to add to the realism of the teleconferencing experience. Directional, i.e., stereo audio, which a listener perceives as emanating from a particular direction, can compensate for the aforementioned drawback by providing greater voice intelligibility and more effective identification of active talkers. The prior art has considered the use of directional audio for both audio only and audiovisual teleconferences. See S. Shimada and J. Suzuki, "A New Talker Location Recognition Through Sound Image Localization Control in Multipoint Teleconferencing Systems", Elec. and Comm. in Japan, part 1, vol. 72, no. 2, p. 20–28, 1989; Y. Shimizu, "Research on the Use of Stereophonics in Teleconferencing" Bus. Japan, Mar. 1991; F. Harvey, "Some Aspects of Stereophony Applicable to Conference Use", J. of Audio Eng. Soc'y. vol. 1, p. 212–17, Jul. 1963.

A teleconferencing system with a conventional directional audio system is depicted in FIG. 10. The teleconferencing system has two stations 10 and 20 which are interconnected by a transmission system 30. Each station 10 and 20 has two microphones 11 and 12 or 21 and 22 and two loudspeakers 13 and 14 or 23 and 24. Illustratively, signals generated by the microphone 11 are transmitted via a first subchannel of a first duplex audio transmission channel of the transmission system 30 to the loudspeaker 13. The signals generated by the microphone 21 are transmitted via a second subchannel of the first duplex audio transmission channel of the transmission system 30 to the loudspeaker 13. Similarly, signals generated by the microphones 12 and 22 are transmitted via a second duplex audio channel to the speakers 24 and 14, respectively.

The audio system depicted in FIG. 1 is disadvantageous for several reasons:

1. The amount of equipment and number of audio transmission channels necessary to implement the system is at least double that of a monaural system.

2. As depicted, signals produced by the loudspeakers 13 and 14 may be acoustically coupled, for example, via acoustic coupling paths 15 into the microphones 11 and 12, respectively. Similarly, signals produced by the loudspeakers 23 and 24 may be acoustically coupled, for example, via acoustic coupling paths 25, into the microphones 21 and 22, respectively. In addition, sounds may be cross-coupled between the two audio channels at each station, e.g., from the loudspeaker 23 to the microphone 22, and/or from the loudspeaker 13 to the microphone 12. Such acoustic cross-coupling compromises feedback stability and echo performance.

3. The sound quality is limited because unidirectional cardioid microphones must be used. Unidirectional microphones do not reject room reverberation and ambient noise as well as microphones with a greater directional sensitivity.

In a second conventional directional audio system, each teleconferencing participant is given his or her own microphone. When a particular participant speaks into his or her assigned microphone, an audio signal is generated. Furthermore, information regarding which speaker is presently speaking is determined based on which microphone generates the strongest signal. The strongest generated audio signal and information regarding the identity of the speaker are transmitted to a second station. At the second station, a virtual sound location of the received audio signal is selected based on the information regarding the identity of the speaker. For example, the virtual sound location may be selected to coincide with the image of the speaker on a display device at the second station. A sound is regenerated from the received audio signal. The sound is reproduced in a manner such that it is perceived as emanating from the virtual sound location. This audio system is also disadvantageous because there is a reduction in the naturalness (i.e., perception that the remote participants are physically present) of the conference if each participant has to wear, or be seated in front of, an assigned microphone.

It is an object of the present invention to provide an audio system for a teleconferencing system which overcomes the disadvantages of the prior art.

SUMMARY OF THE INVENTION

This and other objects are achieved by the present invention which provides a monochannel audio system using beam forming, dynamically self-steering microphone arrays. A microphone array is a device, having a plurality of microphones, which is capable of detecting a sound and the direction of the source of the sound. Illustratively, a microphone array according to the present invention covers a particular field which is divided into fixed, non-overlapping volume zones or sectors. Using a microphone array according to the invention, when a sound is detected, its source is located and a highly directional beam is formed in the sector or zone containing the source of the sound. Only one beam is illustratively formed at any instant depending on the location of the source of the sound. Thus, ambient noise, room reverberation and acoustic coupling are greatly reduced. In addition to enhancing speech quality and reducing reverberation, noise and acoustic coupling, the microphone array is capable of outputting a signal indicating which volume zone contains the source of the sound.

A teleconferencing system according to the invention includes a video camera at a first station for generating a video signal representative of a video image of the first station. A microphone array is also provided at the first station which receives a sound from one or more fixed, non-overlapping volume zones of the first station. The microphone array generates a monochannel audio signal representative of the received sound and a direction signal indicating from which of the volume zones of the first station the sound originated. The teleconferencing system also includes a display device at a second station for receiving the video signal generated by the video camera in the first station and for displaying the video image of the first station regenerated from this video signal. A loudspeaker control device is also provided at the second station for receiving the monochannel audio signal and the direction signal generated by the microphone array of the first station. The loudspeaker control device selects a virtual location on the displayed video image depending on the received direction signal. Illustratively, the virtual location is selected to coincide with the portion of the image displayed on the display screen depicting the volume zone of the first station indicated by the direction signal. In addition, the loudspeaker control device generates a stereo audio signal from the received monochannel audio signal which stereo audio signal is perceived as emanating from the virtual location.

Illustratively, it is also possible to omit the video cameras and display devices, i.e., to provide a directional "audio only" teleconferencing system. In this case, each volume zone of the first station is mapped, i.e., assigned, to a particular virtual location of the second station. The sound received in a particular volume zone of the first station is reproduced at the second station so that it is perceived as emanating from its assigned virtual location at the second station. Thus, when different speakers, located in separate volume zones of the first station speak, participants at the second station can more easily recognize who is speaking based on the perceived origin (i.e., virtual location) of the sound.

In short, the present invention provides a directional audio system using microphone arrays for outputting a monochannel audio signal and a direction signal indicating the location of the sound. Thus, sound detected in one station may be transmitted via a single channel to a second station and reproduced as a directed sound depending on the direction signal. Because a single channel is used, the cross-coupling problems associated with two channel audio systems are avoided. Furthermore, the naturalness of the conference is improved because the participants need not wear, or be seated directly in front of, assigned microphones.

DETAILED DESCRIPTION OF THE INVENTION

Figure 1:
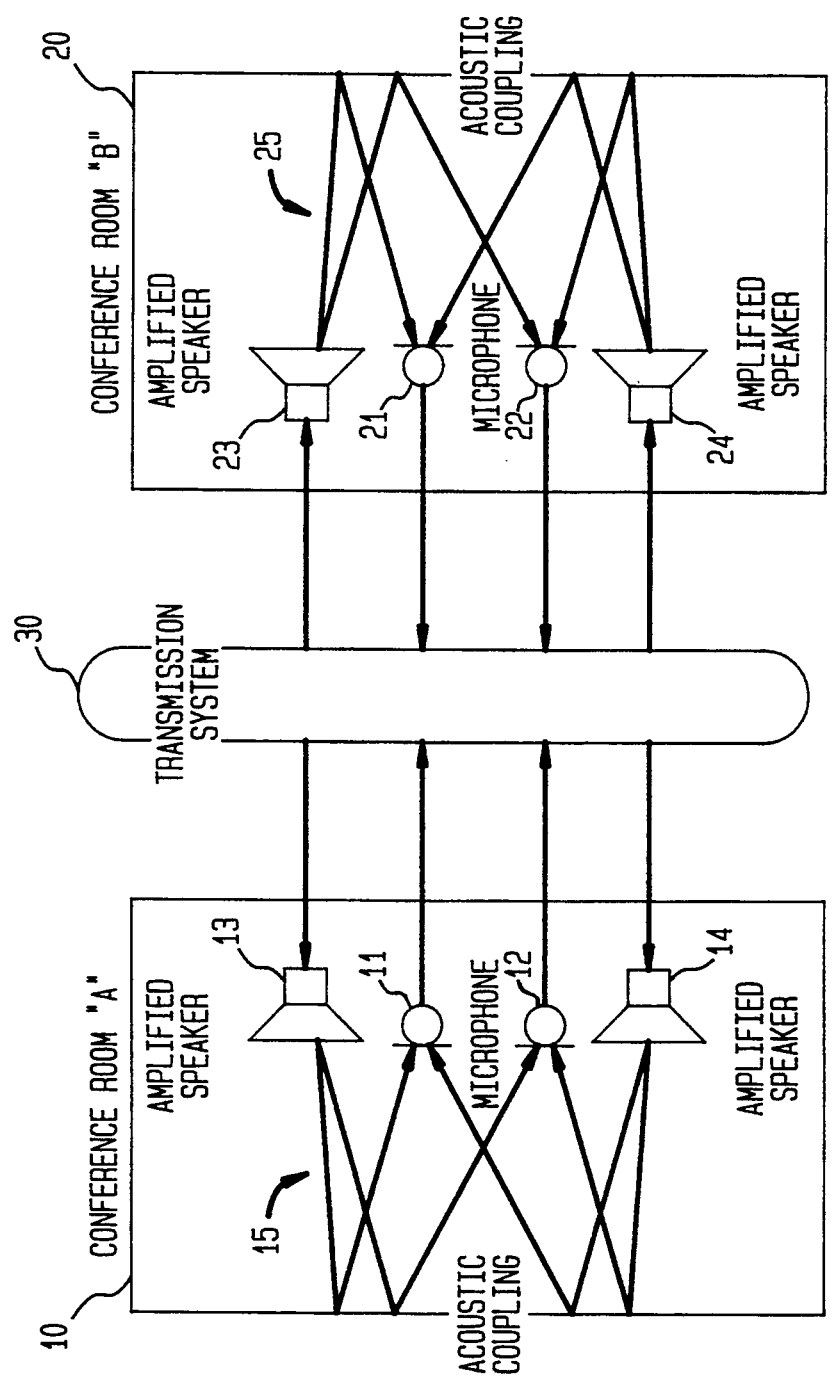
FIG. 1 is a schematic diagram depicting a conventional two duplex channel audio system for use in a teleconferencing system.
Figure 2:
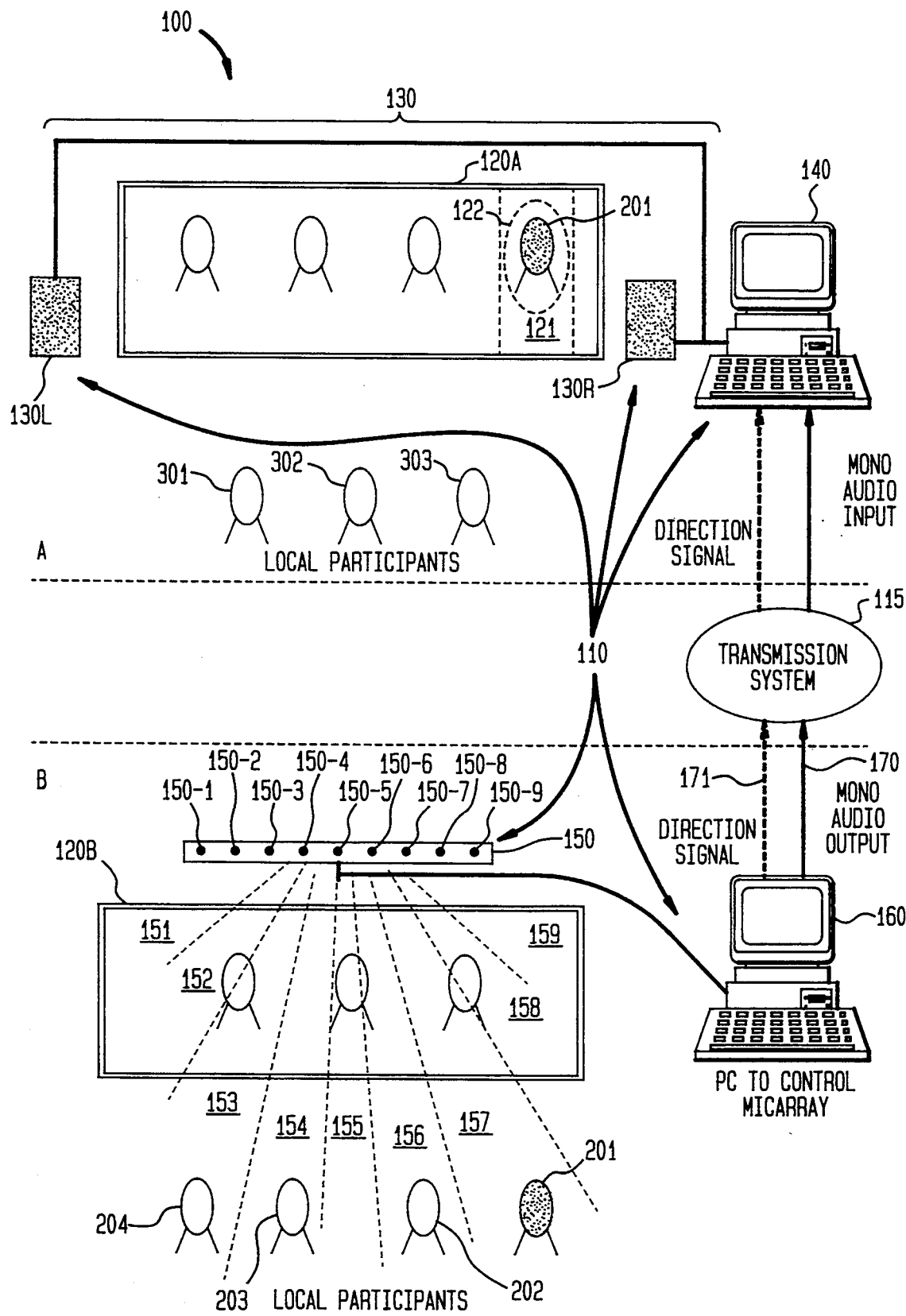
FIG. 2 illustrates an audio system for a teleconferencing system according to the present invention.

Referring now to FIG. 2, a teleconferencing system 100 is depicted. The teleconferencing system has two stations labeled A and B which are remotely located from one another. Participants 301, 302 and 303 at the station A are in audio and video communication with the participants 201, 202, 203 and 204 at the station B. To accomplish the communication, each station has a display device 120A or 120B for displaying a video signal received from the other station. For example, each station may have a wide aspect ratio video screen, such as a 16×9 video screen measuring 80" by 46" 120A or 120B. Each display device displays an image, generated from a video signal received from the other station, of the participants at the other station. Each station also has a video camera (not shown) for generating a video signal representative of the image of the participants thereat for transmission to the other station.

In addition, an audio system 110 is provided for detecting sounds at each station, transmitting audio signals representative of those sounds between the two stations via a transmission system 115 and reproducing the sound detected at each station in the other station. In FIG. 2, only equipment for one-way audio transmission from the station B to the station A is shown. However, it may be appreciated that similar reciprocal equipment may additionally be provided for audio transmission from the station A to the station B so as to establish two-way communication. The audio system 110 is shown having a stereo loudspeaker system 130 and a loudspeaker control device 140 at station A and a microphone array 150 and a microphone array control device 160 at station B.

In an illustrative embodiment, an audio only teleconferencing system may be provided in which the display devices 120A and 120B and the video cameras (not shown) are omitted. The stations A and B are otherwise similar.

In order to detect both a sound and its direction, the station is divided into a number of fixed volume zones 151, 152, 153, 154, 155, 156, 157, 158 and 159. The microphone array 150 may selectively form a highly directional beam, i.e., detect sounds only in, a particular individual or group of zones. See K. Farrell, R. Mammone and J. Flanagan, "Beamforming Microphone arrays for Speech Enhancement", 1992 Proc. of ICASSP, IEEE, p. 285–288; W. Kellermann, "A Self Steering Digital Microphone Array", 1991 Proc. of ICASSP, IEEE p 3581-3584. In the station B the microphone array 150, under the control of the microphone array control device 160, illustratively successively "scans", i.e., forms a highly directional beam in each volume zone 151-159 of the station B. If a sound is detected in a particular zone, the microphone array control device 160 illustratively causes the microphone array 150 to maintain a beam in that particular zone. In effect, the microphone array control device 160 lowers the volume of the sound in the other zones, i.e., the microphone array 150 becomes "more deaf" in these other zones.

The microphone array 150 comprises a number of individual microphones 150-1, 150-2, 150-3, 150-4, 150-5, 150-6, 150-7, 150-8 and 150-9. Thus, the microphone array 150 of the present invention has nine microphones although this is only illustrative. The microphone array 150 provides 180° coverage of the conference room at the station B. Illustratively, a volume zone 151-159 is provided for each microphone, each of which zones is a sector of the 180° field having a 20° angle.

The microphone array 150 provides spatial information as to the location of the speaker with a 20° resolution. For example, sounds may emanate from a particular part of the room at station B, such as the volume zone 157, when the speaker 201 talks. The microphone array 150 detects the sound of the speaker 201 when the zone 157 is scanned and transmits an audio signal representative of the detected sound to the microphone array control device 160 such as a personal computer. The microphone array control device 160 transmits this audio signal via a single mono audio channel 170 to the Station A. In addition, the microphone array control device 160 quickly determines the volume zone from which the sound emanated (i.e., zone 157). A direction signal which indicates the zone 157 containing the sound source 201 is transmitted from the array control device 160 to the station A. Illustratively, the direction signal is transmitted on a low bit rate, narrow bandwidth side channel 171. For example, the direction signal may be a sequence of bits, e.g, four bits, which is periodically transmitted to the station A. A unique pattern of bits is illustratively assigned to each zone, e.g., logic bits '0001' would indicate zone 151, '0010' would indicate zone 152, etc.

In addition, the microphone array control device 160 illustratively causes the microphone array 150 to form only one beam at any time. This provides for improved audio quality by reducing ambient noise, room reverberation and acoustic coupling.

The monochannel audio signal and direction signal transmitted from the station B are received in the loudspeaker control device 140. Illustratively, the loudspeaker control device 140 is shown as a personal computer, e.g., a Macintosh II personal computer manufactured by Apple Computer, Inc. The loudspeaker control device 140 determines, based on the volume zone of the source of the sound (as indicated by the received direction signal), a virtual location 121 on the display device 120A. Illustratively, the virtual location 121 is selected as the location on the display device 120A which displays the image of the same volume zone 122 indicated by the direction signal (i.e., the image of the source of the sound, such as the speaker 201).

The loudspeaker control device 140 also regenerates the sound from the audio signal received from the station B in a manner such that the sound is perceived as emanating from the virtual point 121. To that end, the loudspeaker control device 140 divides the received monochannel audio signal into two audio signals corresponding to left and right stereo channels, respectively. The loudspeaker control device 140 then filters the audio signal of each channel separately, for example, using a digital signal processor. If the loudspeaker control device 140 is a Macintosh II personal computer, then the audio signals may be filtered using a Focal Point 3D Audio signal processor manufactured by Focal Point. The Focal Point 3D Audio signal processor has an input for receiving the monochannel audio signal and left and right stereo audio signal outputs. The direction signal may be received in the Macintosh II personal computer via a separate RS-232 input. A computer program executed by the Macintosh II personal computer instructs the Focal Point 3D Audio signal processor to reproduce sound that is perceived as emanating from particular locations of the room depending on the received direction signal. Such a loudspeaker control device 140 provides for flexibility in designing and rearranging each station A or B.

The filtering of the stereo audio signals performed by the loudspeaker control device 140 may include, attenuating the audio signal, phase shifting the audio signal and/or frequency shaping the audio signal. Thereafter, the filtered audio signal corresponding to the left channel is fed to the left loudspeaker (or loudspeakers) 130L and the filtered audio signal corresponding to the right channel is fed to the right loudspeaker (or loudspeakers) 130R. The filtering of the left and right channel audio signals is performed such that the sound reproduced by the loudspeakers 130L and 130R is perceived as emanating from the virtual location 121. See, G. Kendall and W. Martens, "Simulating the Cues of Spatial Hearing in Natural Environments" 1984 ICMC Proceedings, p. 111-25; S. Shimada and J. Suzuki, "A New Talker Location Recognition Through Sound Image Localization Control in Multipoint Teleconferencing Systems", Elec. and Comm. in Japan, part 1, vol. 72, no. 2, p. 20-28, 1989; L. Ludwig, "Extending the Notion of a Window System to Audio", Computer, IEEE, p. 66-72, 1990; B. Gehring, Focal Point 3D Audio User's Guide, rev. 1, Nov. 1991.

In summary, a teleconferencing system is provided which uses a dynamically self-steering beam forming microphone array to produce a monochannel audio signal and a direction signal indicating the sector or zone containing the source of the audio signal. These signals are received at a second station where sound regenerated from the monochannel audio signal is reproduced as a pseudo stereo sound which is perceived as emanating from a location corresponding to the image of the source displayed on a display device at the second station. Thus, a directional monochannel audio system is provided with minimal added equipment and which avoids the acoustic crosscoupling, and sound quality problems of dual channel stereo audio systems. Furthermore, the use of a microphone array provides that each participant need not be attached to, or seated directly in front of, an assigned microphone.

Finally, the aforementioned embodiments are intended to be merely illustrative of the invention. Numerous other embodiments may be devised by those having ordinary skill in the art without departing from the spirit or scope of the following claims.

We claim:

1. A method for transmitting audio and video signals between first and second stations comprising the steps of:

receiving, at a microphone array located in a first station, a sound from at least one of a plurality of non-overlapping volume zones of said first station, determining, at said first station, based on the sound detected in each of said zones, a zone in which said sound originated by successively forming a highly directional beam in each of said zones, and transmitting from said first station to a second station a monochannel audio signal representative of said sound, a direction signal indicating said zone of origin of said sound and a video signal representative of an image of said first station.

2. The method of claim 1 wherein one zone is provided for each microphone of said array.

3. The method of claim 1 further comprising the steps of:

displaying, on a display device in a second station, a video image, regenerated from said video signal, of said first station, selecting, at said second station, a virtual location on said displayed video image depending on said direction signal, and generating stereo sound at said second station from said monochannel audio signal which stereo sound is perceived as emanating from said virtual location on said displayed video image.

4. The method of claim 3 wherein said virtual location is selected to coincide with the portion of said displayed image depicting the volume zone indicated by said direction signal.

5. The method of claim 3 wherein said generating step comprises dividing said received monochannel audio signal into left and right audio signals, filtering said audio signals depending on said virtual location, and driving a right group of at least one loudspeaker with said filtered right audio signal and a left group of at least one loudspeaker with said filtered left audio signal.

6. The method of claim 5 wherein said filtering step comprises attenuating, frequency shaping and phase shifting said audio signals.

7. The method of claim 1 wherein said volume zones are adjacent sectors covering a field of up to 180°.

8. A station for transmitting audio and video signals to at least one another station comprising:

a video camera for generating a video signal representative of a video image of said station, and a microphone array for receiving a sound from at least one of a plurality of volume zones into which said station is divided and for generating a monochannel audio signal representative of said received sound and a direction signal indicating, based on the sound detected in each of said zones, the zone at said station from which said sound originated, wherein said microphone array comprises control means for causing said microphone array to successively form a highly directional beam in each of said volume zones and, in response to detecting a sound in a particular one of said zones, outputting said direction signal indicating said particular zone.

9. The station of claim 8 wherein said control means comprises means for maintaining a beam only in said particular zone, in response to detecting a sound in said particular zone.

10. The station of claim 8 wherein said microphone array detects sound at said station in a field of up to 180°.

11. The station of claim 8 wherein said microphone array comprises one microphone for each of said volume zones.

12. A method for transmitting audio signals between first and second stations comprising the steps of:

receiving, at a microphone array located in a first station, a sound from at least one of a plurality of non-overlapping volume zones of said first station, determining, at said first station, based on the sound detected in each of said zones, a zone in which said sound originated by successively forming a highly directional beam in each of said zones, and transmitting from said first station to a second station a monochannel audio signal representative of said sound, and a direction signal indicating said zone of origin of said sound.

13. The method of claim 12 further comprising the steps of:

selecting a virtual location at said second station depending on said direction signal, and generating stereo sound at said second station from said monochannel audio signal which stereo sound is perceived as emanating from said virtual location of said second station.

14. A station for transmitting and receiving audio and video signals to and from, respectively, at least one other station comprising:

a video camera for generating a video signal representative of a video image of said station, a microphone array for receiving a sound from at least one of a plurality of volume zones into which said station is divided and for generating a monochannel audio signal representative of said received sound and a direction signal indicating, based on the sound detected in each of said zones, the zone at said station from which said sound originated, wherein said microphone array comprises control means for causing said microphone array to successively form a highly directional beam in each of said volume zones and, in response to detecting a sound in a particular one of said zones, outputting said direction signal indicating said particular zone.

a display device for receiving a video signal from said other station and for displaying a video image of said other station, and a loudspeaker control device for receiving a monochannel audio signal and a direction signal from said other station, for selecting a virtual location on said displayed video image depending on said received direction signal, and for generating stereo sound from said received monochannel audio signal which stereo sound is perceived as emanating from said virtual location on said displayed video image.

15. The station of claim 14 wherein said virtual location coincides with a portion of said displayed image depicting the volume zone indicate by said direction signal.

16. The station of claim 14 further comprising a plurality of loudspeakers connected to said loudspeaker control device including a first loudspeaker receiving a first channel of said stereo audio signal and a second loudspeaker receiving a second channel of said stereo audio signal.

17. The station of claim 14 wherein said loudspeaker control device further comprises processing means for dividing said received monochannel audio signal into two audio signals and for filtering each of said audio signals.

18. The station of claim 17 wherein said processing means comprises means for attenuating, phase shifting and frequency shaping said audio signals.

19. A teleconferencing system comprising:
a first station including
video camera means for generating a video signal representative of a video image of said first station, and
a microphone array for receiving a sound from at least one of a plurality of fixed, non-overlapping zones into which said first station is divided, and for generating a monochannel audio signal representative of said received sound and a direction signal indicating, based on the sound detected in each of said zones, a zone of said first station in which said sound originated, wherein said microphone array comprises control means for causing said microphone array to successively form a highly directional beam in each of said volume zones and, in response to detecting a sound in a particular one of said zones, outputting said direction signal indicating said particular zone, and
a second station including
a display device for receiving said video signal from said first station and for displaying a video image of said first station, and
a loudspeaker control device for receiving said monochannel audio signal and said direction signal from said first station, for selecting a virtual location on said displayed video image depending on said received direction signal, and for generating stereo sound from said received monochannel audio signal which stereo sound emanates from said virtual location on said displayed video image.

* * * * *